April 19, 1949.  E. ALMDALE  2,467,516
METHOD OF ELECTRICALLY WELDING BOX SECTIONS
Filed April 5, 1945
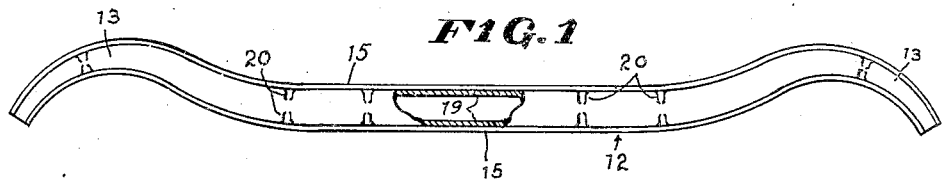
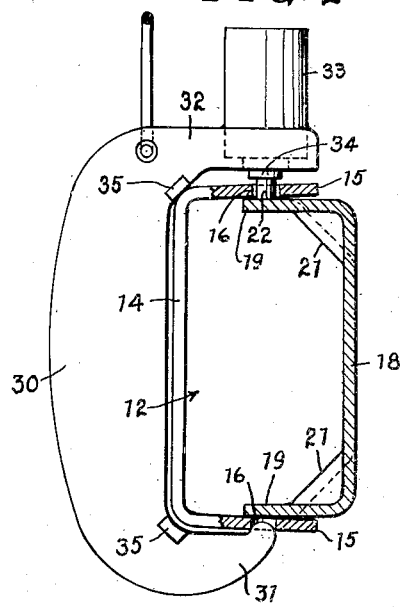
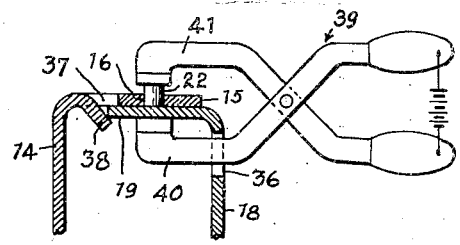
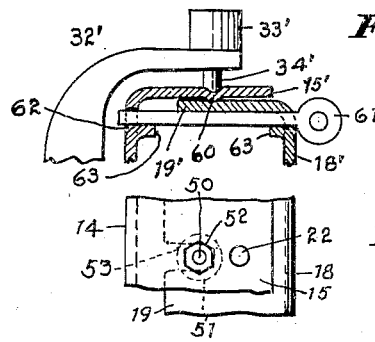
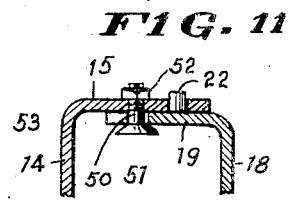
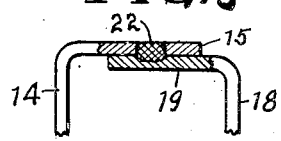
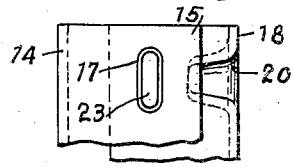
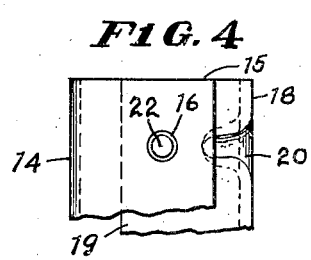
INVENTOR.
EINAR ALMDALE
BY
*Louis W Klemith*
ATTORNEY.

Patented Apr. 19, 1949

2,467,516

UNITED STATES PATENT OFFICE 2,467,516

METHOD OF ELECTRICALLY WELDING BOX SECTIONS

Einar Almdale, Rocky River, Ohio, assignor to The Midland Steel Products Company, Cleveland, Ohio, a corporation of Ohio Application April 5, 1945, Serial No. 586,767

2 Claims. (Cl. 219—10)

This invention relates to new and useful improvements in welding and more particularly to the welding of frame parts for automotive vehicles.

An important object of the invention is to provide methods for permanently joining parts to form a hollow elongated body, the interior of which is generally inaccessible for the insertion of any means to facilitate the union of said parts.

Another object of the invention is to provide a method for permanently joining parts to form a hollow elongated body including forming the parts to facilitate the insertion into the body of means for joining the parts.

Other objects and advantages of the invention will become apparent during the course of the following description.

In the accompanying drawings forming a part of the description and wherein like numerals are employed to designate like parts throughout the several views, Fig. 1 is a side elevation of the improved side rail of an automotive vehicle, Fig. 2 is an enlarged transverse section of the same showing one form of welding apparatus employed in the manufacture thereof, Fig. 3 is a transverse section of the top of the rail showing the completed weld, Fig. 4 is a top plan of a fragment of the hollow rail shown in Fig. 2, Fig. 5 is a perspective view of a welding slug or projection employed in the manufacture of the rail, Fig. 6 is a view similar to Fig. 4 showing an elongated slug or projection used as a modification of the cylindrical slug, Fig. 7 is a perspective view of this elongated slug, Fig. 8 is a transverse section of the upper portion of a modified form of rail and welding apparatus therefor, Fig. 9 is a transverse section showing the upper portion of a modified form of rail with a part of a welding apparatus associated therewith, Fig. 10 is a top plan of a further modified form of the side rail, Fig. 11 is a transverse section of the same.

The invention is disclosed in connection with the manufacture of hollow side rails for automotive frames and particularly where the side rail 12, having kick-up portions 13 at its ends, is formed from an outer channel section steel stamping 14 of varying cross section throughout its length, composed of a vertical web and a pair of flanges 15 which may be arranged at right angles to the web or slightly flared as shown in Fig. 2. Each of these flanges 15 is provided with circular apertures 16 shown in Fig. 4 at suitably spaced intervals throughout the length of the rail or elongated slots 17 extending lengthwise of the rail as shown in Fig. 6. These openings are preferably located about one-half of the distance between the web of the channel and the free edge of the flanges 15.

The open channel of the stamping 14 is closed to form the side rail into a closed hollow box section throughout its length by a second channel section steel stamping or sub-rail having a web 18 varying in depth to conform to the shape and section of the main rail 12. The web 18 has a pair of flanges 19, extending at substantially right angles thereto or at a slight outward divergence, to be nested within the rail 12 and extending inwardly toward the web 14 to lie against the inside of the flanges 15 covering the openings 16. This sub-rail stamping may be deformed at intervals inwardly at its corners and at points opposite the openings 16, with depressions 20 to cause portions 21 of the metal to bridge or form gussets across the inside corners of the sub-rails to thereby reinforce the flanges 19 against collapse or inward movement beyond their right angular disposition when pressure is exerted upon the box section to unite the parts thereof. When the inner and outer rails of the box section are completely assembled and in final position and form, the flanges 15 and 19 are at right angles to their webs as shown in Fig. 3, having been pressed into such position from the divergence shown in Fig. 2 by the pressure used in joining the parts, as will now be described.

With the channel stampings arranged in the position shown in Fig. 2, a cylindrical slug 22 of slightly greater height than the thickness of the flange 15 is inserted in a hole 16 in the uppermost flange 15, or an elongated slug 23 of the same characteristics is inserted into a slot 17, if that be the form of the holes provided in flanges 15 to provide a greater area of union. These slugs may be made of brass, steel or of a suitable metal or alloy, but preferably of a metal having a slightly lower fusion point or one equal to that of the channel sections forming the rail.

It is proposed to fuse or melt these slugs, one or more at a time, by means of any suitable tool or mechanism which will conduct electric welding current from a source through the slug and surrounding portions of the overlapped flanges 15 and 19 and be grounded, while axial pressure is being exercised upon the slug to weld the overlapped flanges together with the aid of the slug. The instrument in Fig. 2 is illustrated as a C-shaped yoke 30 of conducting metal to surround three sides of the hollow rail and with its lower end 31 shaped to anchor in the hole 16 in the lower flange, or grip it in any other suitable manner, while pressure is applied to the slug from the top arm of the yoke. For this purpose the top arm 32 of the yoke has an air or hydraulic power cylinder 33 secured thereto with a piston equipped with an electrode 34 electrically connected to a source of welding current. The inner corners of the yoke may be provided with blocks 35, and these may be of insulating material when the welding current is to be grounded through the bottom of the hollow rail and the lower arm 31, or these blocks may be electrical conductors in the event the yoke is designed to cause them to contact one or more corners of the hollow section rail to ground out the current through a shorter path when the power cylinder forces the electrode 34 against the slug. Thus, the hollow rail is pressed from opposite sides to cause the welding current to pass from the electrode, into the slug to heat it along with the edges of the opening 16 and the flange 19 from where the current grounds in the shortest path through the yoke or a separate ground connection.

When brass slugs are used, they are completely melted to spread for a considerable area around the holes 16 between the overlapped flanges 15 and 19 to secure them together, while at the same time the hole 16 is substantially filled with this fused material which bonds itself to the sides of the hole. When slugs made of steel are used and welding current is passed therethrough, resistance to the passage of current between the slug and the flanges, creates welding heat in these parts whereby they are fused together under pressure to securely fasten the parts together as shown in Fig. 3. The welding current passes through the slug and adjoining portions of the flanges to heat them to a state of fusion so that the slug and flanges arrive at a fusion point practically simultaneously to be pressure welded together upon the operation of the power cylinder.

In Fig. 8 the tops of channels nested as before, are shown in which it is permissible to make other openings such as openings 36 in the web of the inner channel and other openings 37 are provided by broaching the outer flanges 15 and bending lugs 38 inwardly of the section to provide inclined ledges for the top flange 19 of the inner channel to ride upon and be supported in close contact with the flange 15 when the two channels are nested in assembly. Thus, tight engagement of these flanges is established and made ready for the welding of slugs 22 entered into the holes 16. The flanges 15 in this case may be initially formed at perfect right angles to their web 14 since the lugs 38 will serve the function of holding the overlapping flanges in their normal planes. Another form of welding instrument, like spot welding tongs 39 is used by inserting its lower jaw 40 through the opening 36 with its electrode engaging the inner side of flange 19 under the slug, while the other jaw 41 with its electrode, engages the slug and pressure is exerted upon the crossed handles to close the jaws upon the assembly and squeeze the rapidly heated and fusing slug into the adjacent fused metal of the two flanges. Obviously, the inner jaw backs up the flanges and prevents their inward deflection under stress of welding pressure as welding takes place as shown in Fig. 3. It will be understood that the welding tongs 38 are suitably connected to a source of electric current diagrammatically shown, in order to pass welding current from one jaw to the other through the slug 22 and overlapped flanges when the handles are pressed toward each other.

Figs. 10 and 11 show another means for holding the flanges together and preventing their inward deflection under pressure of welding. The bolt 50 with a frustro-conical head 51 is suspended by a nut 52 through an opening in the outer flange 15 prior to assembly of the rail sections to form the hollow rail. The inner flange 19 of the other channel is provided with a slot 53 to slide past the bolt above the conical head as the two channels are nested and forced together, thereby causing the flange 19 to ride upon the conical heads 51 and squeeze the two flanges together to oppose deflection under the welding pressure exerted with a tool similar to that illustrated in Fig. 2. A stud 22 or 23 is inserted in a hole of the outer flange 15 and the welding thereof is accomplished as described in Fig. 2. After the flanges have been welded together on the top and bottom of the side rail, the nuts 52 are unscrewed from the bolts permitting them to fall into the hollow rail which is tilted on the end to dump the bolts out of the rail for use on other rails.

Fig. 9 illustrates another modification of the invention wherein parts corresponding to parts heretofore described, are designated with the same numerals but with prime coefficients added. In this modification, the flanges 15' and 19' are projection welded together by providing the outer flange 15' with integral slugs in the form of inwardly depressed welding projections 60 and backing up the flange with a back-up bar or rod 61 under each projection 60 by passing the bar through aligned openings 62 in the webs of the channel sections. These openings are provided by broaching out opposed portions of the webs to provide the lower sides of the openings with flanges 63 extending inwardly of the hollow rail, thus providing enlarged bearing portions for the bar 61 to support the flanges during welding, and prevent their inward deflection. A projection welding yoke 32' with a welding electrode 34' fitting in said depressed projection 60 is applied to the hollow rail as shown in Fig. 2, so that pressure and current applied thereby to the flanges will projection weld the flanges together in a manner well understood, while the flanges are firmly backed up with bar 61. This type of back up bar may be used in connection with overlapping flanges 15 and 19 shown in Fig. 3 where no construction or means are shown for preventing inward deflection of the flanges under the stress of welding. In all of the modifications it is to be understood that the overlapped flanges at the top of the rails are first welded together, after which the rail is reversed to dispose its unwelded flanges uppermost so that they can also be welded together in the same manner.

It is to be understood that various changes in the size, shape and arrangement of parts may be resorted to without departing from the spirit of the invention.

I claim:

1. A method of forming a box section from two electrically conductive channel sections by overlapping and welding together the flanges of said channel sections comprising deforming the outer flanges to provide means for supporting the inner flanges against inward deflection, overlapping the flanges of the channels and supporting the inner flanges by the said means, and welding the flanges together by the combined action of inward pressure and electric current.

2. A method of forming a box section from two electrically conductive channel sections by overlapping and welding together the flanges of said channel sections comprising deforming the outer flanges to provide means for supporting the inner flanges against inward deflection comprising angularly inwardly bent portions of the outer flange adapted to engage the inner surface of the inner flange, overlapping the flanges of the channels and supporting the inner flanges by the said means, and welding the flanges together by the combined action of inward pressure and electric current.

EINAR ALMDALE.

REFERENCES CITED

The following references are of record in the file of this patent:

UNITED STATES PATENTS

| Number | Name | Date |
|---|---|---|
| 906,233 | Jack | Dec. 8, 1908 |
| 1,020,056 | Rietzel | Mar. 12, 1912 |
| 1,039,138 | Johnson | Sept. 24, 1912 |
| 1,278,357 | Lachman | Sept. 10, 1918 |
| 1,749,917 | Meadowcroft | Mar. 11, 1930 |
| 1,750,833 | Carns | Mar. 18, 1930 |
| 1,995,368 | Sunnen | Mar. 26, 1935 |
| 2,062,287 | Block | Dec. 1, 1936 |
| 2,177,991 | Maddock | Oct. 31, 1939 |
| 2,204,348 | Finger | June 11, 1940 |
| 2,339,529 | Unetic | Jan. 18, 1944 |

FOREIGN PATENTS

| Number | Country | Date |
|---|---|---|
| 198,669 | Switzerland | Dec. 16, 1938 |